United States Patent [19]

Yang

[11] Patent Number: 5,446,352
[45] Date of Patent: Aug. 29, 1995

[54] SERIES OR COMPOUND MOTOR CONTROL CIRCUIT HAVING DUAL SERIES WINDINGS

[76] Inventor: Tai-Her Yang, 5-1 Taipin St., Si-Hu Town, Dzan-Hwa, Taiwan

[21] Appl. No.: 102,295

[22] Filed: Aug. 5, 1993

[30] Foreign Application Priority Data

Aug. 5, 1992 [GB] United Kingdom ............... 9216579

[51] Int. Cl.[6] ............................................. H02P 7/00
[52] U.S. Cl. .................................... 318/248; 318/527
[58] Field of Search ............... 318/246, 248, 251, 105, 318/108, 113, 527, 529, 495, 500, 254, 139, 138, 439

[56] References Cited

U.S. PATENT DOCUMENTS

| | | | |
|---|---|---|---|
| 3,336,516 | 8/1967 | Kelley | 318/248 |
| 4,330,742 | 5/1982 | Reimers | 318/139 |
| 4,490,665 | 12/1984 | Meyer et al. | 318/696 |
| 4,500,819 | 2/1985 | Trusock et al. | 318/248 X |
| 4,639,647 | 1/1987 | Posma | 318/246 X |
| 4,716,487 | 12/1987 | Horvath et al. | 318/490 |

*Primary Examiner*—Jonathan Wysocki
*Attorney, Agent, or Firm*—Bacon & Thomas

[57] ABSTRACT

An improved driving circuit of a series or compound motor includes at least two series excitation field windings, one end of each of the series excitation windings being jointly connected, with the same polarity, to the armature, and at least one set of the series excitation field winding is isolated by means of diodes so as to receive power from different power sources.

4 Claims, 1 Drawing Sheet

10

SERIES OR COMPOUND MOTOR CONTROL CIRCUIT HAVING DUAL SERIES WINDINGS

BACKGROUND AND SUMMARY OF THE INVENTION

The present invention is an improvement to a driving circuit for a series or compound motor. The improvement is constituted by two sets of series excitation field windings, one end of each of the series excitation windings being connected, with the same polarity, jointly to the armature, and at least one of the series excitation field windings being connected by means of diodes to receive power from two different power sources. The two parallel series excitation field windings replace the conventional single series excitation field windings. By means of this innovative design, the magnetic field of the series excitation motor can be better controlled by causing a decrease in the excitation current from one of the excitation windings to be offset by an increase in the other and thereby reduce the drop in efficiency of a conventional series excitation motor under light load or overload conditions.

DETAILED DESCRIPTION OF THE INVENTION

In a conventional series excitation motor, efficiency decreases at light loads because of the lower excitation current, and speed regulation becomes more difficult as the torque to revolving speed ratio becomes lower. In addition, efficiency is decreased during transient overload conditions as the magnetic field becomes saturated, i.e., as the excitation current passing the series excitation field winding exceeds what is required for saturation and excitation, the excessive voltage drop resulting from excessive excitation current worsening the output power and efficiency of the conventional series excitation motor.

Figure 1:
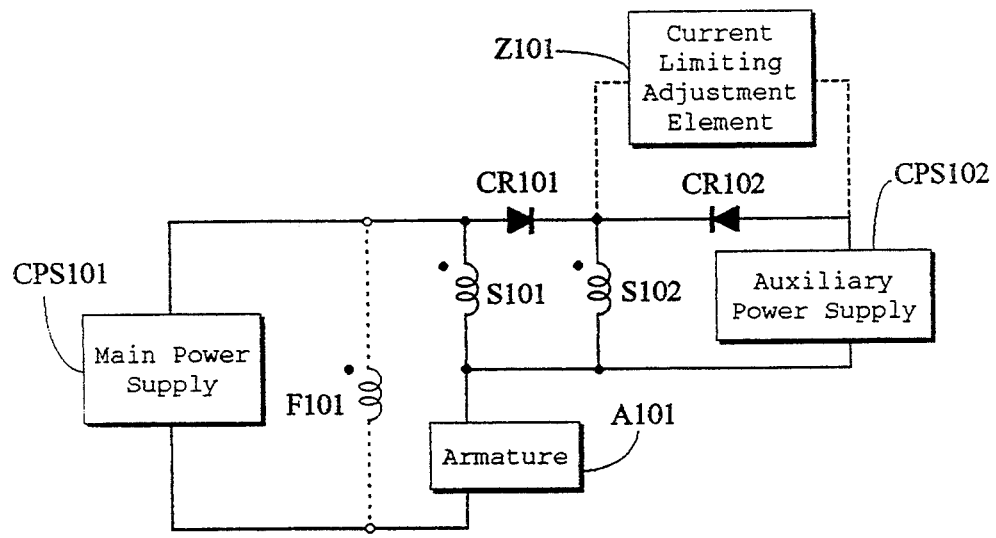
FIG. 1 is a schematic drawing of an improved driving circuit for the series or compound motor of a preferred embodiment of the invention.

To solve this problem, as shown in FIG. 1, the improved driving circuit includes at least two series excitation field windings, one end of each of the series excitation windings being jointly connected, with the same polarity, to the armature, and at least one set of the series excitation field windings is isolated by means of diodes so as to receive power from different power sources. The two series excitation field windings replace the conventional single series excitation field winding. In addition, a separately-excited field winding F101 can be added to provide a compound motor which also includes the above pair of series excitation field windings.

As shown in FIG. 1, main series excitation field winding S101 is driven by a main power source CPS101. A blocking diode CR101 is connected in series between the end of power source of the field winding S101 and an auxiliary series excitation field winding S102, with the polarity arranged so as to prevent the auxiliary excitation power source from exciting the main series winding S101, while allowing auxiliary winding S102 to be excited by both main power source CPS101 and auxiliary power source CPS102.

Main power source CPS101, can be either a single voltage or variable output voltage DC power source, such as a storage battery, a solar energy converter, or a DC generator, or may be obtained from the rectification of an AC power source or other DC power source. The auxiliary power source SPC102 may also be a single voltage or variable output voltage DC power supply, such as a storage battery, a solar energy converter, or a DC generator, or may be obtained from the rectification of an AC power source or other DC power source.

The improved circuit of the embodiment shown in FIG. 1 operates as follows:

(1) When the load is light, or to drive the series motor with a smaller main power source voltage (for example to provide a better control of speed), the excitation provided by the series excitation field winding S101 is supplemented by the excitation provided by the auxiliary excitation power source through winding S102 to improve the efficiency of the motor and the regulation of speed.

(2) The current of the motor rises with the load until the voltage drop of the power supply CPS101 across the main series excitation field winding S101 is larger than the voltage drop of the auxiliary excitation power supply CPS102 across the auxiliary series excitation field winding S101 (taking into account the value of the bias of blocking diode CR101), at which time the current of the auxiliary excitation power supply decreases to zero, because the current of the armature is the sum total of all series excitation currents.

Figure 2:
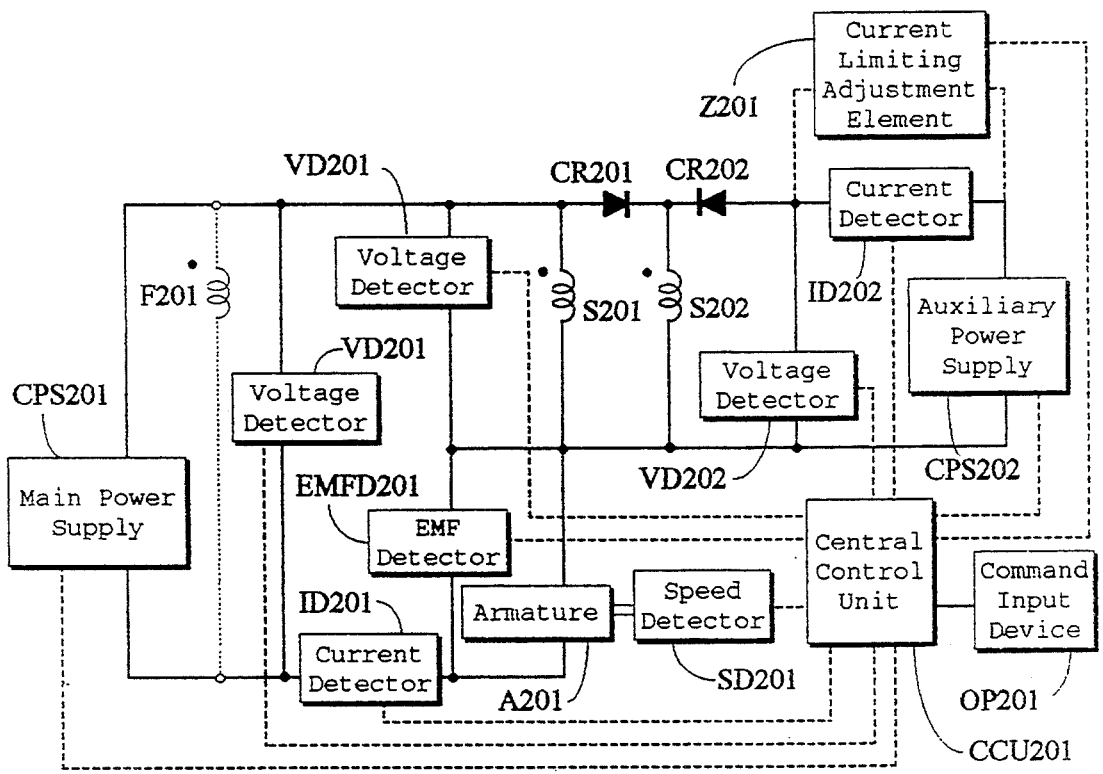
FIG. 2 is a schematic drawing of a variation of the circuit shown in FIG. 1 in which a feedback function is provided.

As shown in FIG. 2, the above circuit may also include components for detecting the state of operation of the motor and the voltage and current of the power supply, and which are connected jointly to a central control unit and to a control interface to form a more precise circuit system providing feedback functions.

As shown in FIG. 2, the improved driving circuit includes at least two series excitation field windings, one end of each of the series excitation windings being jointly connected, with the same polarity, to the armature, and at least one set of the series excitation field windings is isolated by means of diodes so as to receive power from different power sources. The two series excitation field windings replace the conventional single series excitation field winding. In addition, a separately excited field winding F101 can be included to provide a compound motor which also includes the above pair of series excitation field windings.

As shown in FIG. 2, main series excitation field winding S201 is driven by a main power source CPS201. A blocking diode CR201 is connected in series between the end of power source of the field winding S201 and an auxiliary series excitation field winding S202, with the polarity arranged so as to prevent the auxiliary excitation power source from exciting the main series winding S201, while allowing auxiliary winding S202 to be excited by both main power source CPS201 and auxiliary power source CPS202.

Main power source CPS201, can be either a single voltage or variable output voltage DC power source, such as a storage battery, a solar energy converter, or a DC generator, or may be obtained from the rectification of an AC power source or other DC power source. The auxiliary power source CPS202 may also be a single voltage or variable output voltage DC power supply, such as a storage battery, a solar energy converter, or a DC generator, or may be obtained from the rectification of an AC power source or other DC power source.

The feedback detection components of this embodiment include one or more of the following components: a main power supply voltage detection component VD201, an armature current detection component ID201, an armature counter electromotive force (EMF) detection component EMFD201, a motor revolving speed detection component SD201, an auxiliary excitation voltage detection component VD202, and auxiliary excitation current detection component ID202, and a series excitation field voltage drop value detection component VS201. Those skilled in the art will appreciate that all of these components, or any fraction of them, may be selected according to the specific requirements of the motor with which the circuit is to be used. The above detection components may be of digital type or analog type, with an appropriate command input device OP201, which allows the circuit to be controlled manually or by an electrical signal and which is connected to the central control unit CCU201.

Central control unit CCU201, which may be of analog type or digital type, includes electromechanical and/or solid state components for allowing control of the output voltages and currents of the main power source and the auxiliary excitation power source by referring to the setting of the input control unit and the signals from the feedback detection component in known fashion.

In the embodiments in FIGS. 1 and 2, if a storage battery or the like is used as the auxiliary power source, a current limiting adjustment element Z101, Z102 may be connected in parallel to the two ends of the blocking diode CR102 or the current detector ID202 of the auxiliary power source and the auxiliary series excitation field winding. As the main excitation current increases and the voltage drop across the two ends of the main series excitation winding exceeds the voltage provided by the auxiliary power source, a counter current will be formed which can be used to charge the auxiliary storage element. The current limiting adjustment element allows one to adjust the counter current. The current limiting adjustment element Z201 shown in FIG. 2 may be constituted by a resistance element, by an electromechanical or solid state element to be controlled by the central control unit CCU201 to adjust the charging current passing through the storage power element.

While the basic operation of the circuit is essentially the same as described above, the provision of the current limiting element does have the effect, on transient overload, the current of the armature being the sum total of the current of various series excitation field windings, of further increasing the charging current passing the storage power component.

To sum up the above, the present invention is an innovative design, which raises the efficiency of a series excitation motor of the type used widely in the industrial world, and provides improved speed regulation.

As shown in FIG. 1, the improved driving circuit includes at least two series excitation field windings, one end of each of the series excitation windings being jointly connected, with the same polarity to the armature, and at least one set of the series excitation field windings is isolated by means of diodes so as to receive power from different power sources. The two series excitation field windings replace the conventional single series excitation field windings. In addition, a separately excited field winding F101 can be included to provide a compound motor which also includes the above pair of series excitation field windings.

I claim:
1. A motor control circuit, comprising:
   a main power supply;
   an armature; and
   a main series winding connected in series with the armature and the main power supply, the improvement wherein:
   an auxiliary series winding is connected in parallel between the main series winding and an auxiliary power supply, a first end of said auxiliary series winding being connected to a first end of the main series winding, to the armature, and to one terminal of the auxiliary power supply, and a second end of the auxiliary series winding being connected by a first diode to a second end of the main series winding and by a second diode to a second terminal of the auxiliary power supply, the first and second diodes being biased such that the second end of the auxiliary series winding is connected to receive current from both the main and auxiliary power supplies and thereby increase the armature current for improved control at light loads and overload conditions.

2. A motor control circuit as claimed in claim 1, wherein the control circuit further comprises a shunt field winding to form a compound motor control circuit.

3. A motor control circuit as claimed in claim 1, further comprising a central control unit arranged to vary an output of at least one of the main and auxiliary power supplies in response to feedback from at least one detection component selected from the group consisting of a main power supply voltage detection component, an armature current detection component, an armature counter electromotive force detection component, a motor revolving speed detection component, an auxiliary excitation voltage detection component, an auxiliary excitation current detection component, and a series excitation field voltage drop value detection component.

4. A motor control circuit as claimed in claim 1, further comprising a current limiting adjustment element connected between the auxiliary series winding and the auxiliary power supply to permit a charging current to flow between the main series winding and the auxiliary power supply when the voltage drop across the main series winding exceeds the voltage provided by the auxiliary power source.

* * * * *